Oct. 11, 1966 E. C. KNOBLOCK 3,277,683
PUNCH FOR PIPE TAPPING T FITTING
Filed Feb. 25, 1964
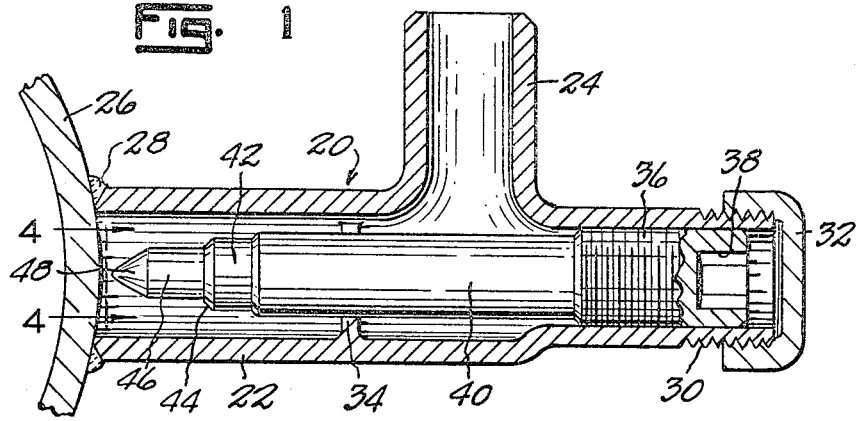
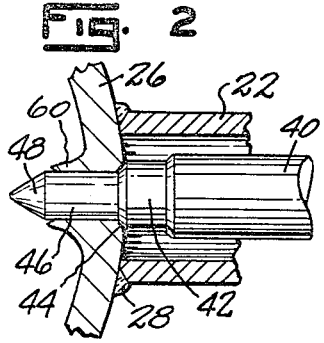
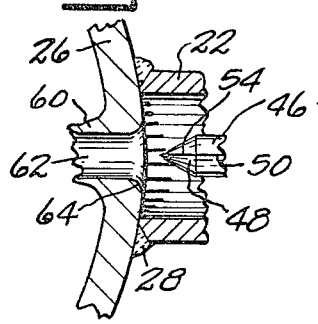
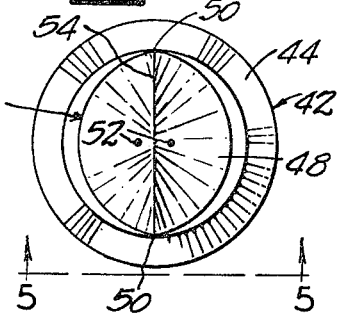
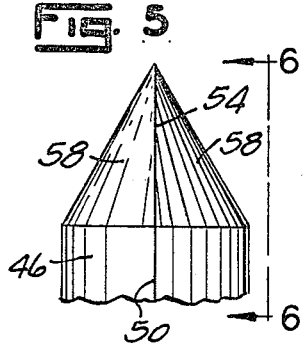
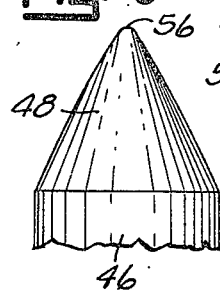
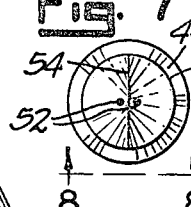
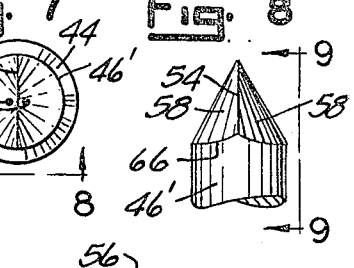
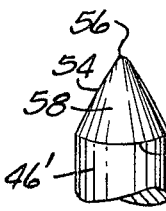
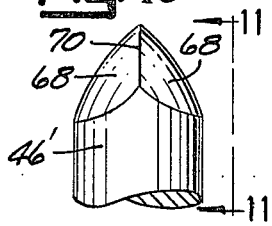
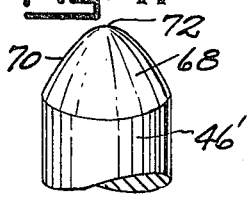
INVENTOR.
EUGENE C. KNOBLOCK
By Eugene C. Knoblock
ATTORNEY

United States Patent Office 3,277,683
Patented Oct. 11, 1966

3,277,683
PUNCH FOR PIPE TAPPING T FITTING
Eugene C. Knoblock, South Bend, Ind., assignor to M. B. Skinner Company, a division of Textron, Inc., South Bend, Ind., a corporation of Rhode Island
Filed Feb. 25, 1964, Ser. No. 347,139
7 Claims. (Cl. 72—71)

This invention relates to a punch for pipe tapping T fittings, and more particularly for T fittings employed in the gas industry and in other industries for tapping a gas or other fluid-containing conduit or vessel for the purpose of withdrawing therefrom to a branch pipe fluid in such container or conduit.

This device is an improvement upon devices of the character shown in Merrill et al. Patent No. 2,950,637, dated August 30, 1960, and in Merrill et al. Patent No. 2,990,731, dated July 4, 1961.

The primary object of this invention is to provide a punch mounted in a T fitting welded or otherwise anchored or secured to a steel conduit or container of a fluid, which punch is capable of tapping the member which mounts the fitting quickly and with the exertion of minimum torque or effort so that an operator may perform this service by the use of simple hand tools in combined quarters, such as a small hole dug in the earth to expose a pipe main.

A further object is to provide a punch for use in a device of this character which has a novel tip capable of perforating thick wall steel members without forming a slug and without requiring the use of cutting edges of the character common in drills and other cutters which act by forming chips or shavings.

A further object is to provide a punch of this character having a novel tip providing minimum frictional resistance to rotation when pressed against a work piece being perforated thereby and being characterized by ability to form an opening in a thick wall steel member as it is advanced axially or endwise by rotation of a screw-threaded part thereof having screw-thread connection with a fitting.

A further object is to provide a perforating tool of this character which is capable of perforating a thick wall steel member while cold with minimum resistance to advance of the tool in a swedging perforation-forming operation and with minimum danger of breakage of the tool during the swedging operation.

Other objects will be apparent from the following specification.

In the drawing:

FIG. 1 is a longitudinal sectional view of a T fitting secured to the wall of a pipe to be perforated and containing or utilizing my new punching tool;

FIG. 2 is a fragmentary sectional view illustrating the punching tool at the completion of a perforating operation;

FIG. 3 is a fragmentary sectional view illustrating the punching tool withdrawn from the perforation which has been formed thereby;

FIG. 4 is an enlarged end view of the punching tool as viewed in the direction of arrows 4—4 of FIG. 1;

FIG. 5 is an enlarged elevational view of the tip of the punching tool as viewed in the direction of arrows 5—5 of FIG. 4;

FIG. 6 is an enlarged side view of the tip of the punching tool as viewed in the direction of the arrows 6—6 of FIG. 5 and at right angles to the view shown in FIG. 5;

FIG. 7 is an end view of a modified embodiment of the punching tool;

FIG. 8 is a fragmentary side view of the tip portion of the punching tool shown in FIG. 7, as viewed along the direction of the arrows 8—8 of FIG. 7;

FIG. 9 is a fragmentary side view of the tip of a punch as viewed in the direction of the arrows 9—9 of FIG. 8 and 90 degrees displaced from the view illustrated in FIG. 8;

FIG. 10 is a fragmentary side view of the tip of another embodiment of the punching tool, as seen in side elevation; and FIG. 11 is a side elevational view of the modified form of tool shown in FIG. 10, as seen in the direction of the arrows 11—11 of FIG. 10.

Referring to the drawing and particularly to FIGS. 1 to 6, inclusive, which illustrate one embodiment of the invention, the numeral 20 designates a T fitting. This T fitting is characterized by an elongated tubular part 22 open at its opposite ends, and by an intermediate branch tube portion 24 communicating with tube portion 22. In the form shown, one end portion of the part 22 is adapted to be secured to a fluid-containing steel member, such as a pipe main 26, as by means of a weld 28. It will be understood, however, that the T fitting 20 may be anchored to the fluid-containing member by a saddle or any other means providing a sealed connection between that fluid-containing member and the end of the part 22 of the fitting. The opposite end portion of the part 22 of the fitting is preferably internally screw-threaded and also is externally screw-threaded at 30 and is adapted to mount a conventional sealing cap 32 by means of threads 30. It will also be understood that the branch 24 may be provided with means (not shown) for connection thereto and communication therewith of a branch conduit (not shown). Thus the branch conduit may be welded to fitting part 24 or may be joined thereto by a coupling, a union, or any other means as well understood in the plumbing and pipefitting arts.

If desired the body 22 may be provided with internal lugs 34 spaced circumferentially and serving as guides for my improved punch.

My improved punch comprises an externally screw-threaded end portion 36 screw-threaded in the portion 22 of the fitting remote from the end thereof secured to the pipe or other fluid-containing element 26. An end socket 38 of non-circular shape, such as a hexagonal socket, is formed in the screw-threaded punch part 36 and is adapted to receive the driving end of a wrench or other tool usable to rotate the tool within the fitting. The tool has an intermediate shank portion 40 of smaller diameter than the screw-threaded end part 36 and of smaller diameter than the bore of the part 22 of the fitting. If desired, the shank portion 40 may be of stepped diameter, as by the formation adjacent the end thereof remote from the screw-threaded part 36 of a smaller diameter shank part 42. A frusto conical shoulder 44 is formed in the tool between the shank portion and the perforating end portion of the tool. The perforating portion of the tool includes a part 46 which preferably is of non-circular cross-section, as best seen in FIG. 4, and a tapered portion 48.

The perforating end of the tool is preferably characterized by a pair of substantially diametrically opposed longitudinally extending ribs 50 and by curved or arcuate or part-cylindrical surfaces between said longitudinal ribs 50 which may be defined by axes 52 displaced from but substantially parallel to the longitudinal axis of the tool. Thus the part 46 of the tool is of greatest thickness between the ribs 50 and is of minimum thickness on a diameter thereof extending between the axes 52. The difference in thickness along these two angularly disposed diameters need not be great, for example, from 1/32 inch to 3/32 inch in a tool forming an opening of one-half diameter, so that the deviation of the part 56 from true circular configuration may be small to maintain the maximum strength of the tool end portion.

The tapered tip 48 of the tool is defined by a pair of converging rib parts or ridges 54 which are joined by a curved end edge 56 of small radius. Ridges 54 divide the tip into two opposed tapered sections 58 so as to be characterized by a slight deviation from true circular shape on all transverse planes thereof perpendicular to the axis of the tool. In the form illustrated in FIGS. 1 to 6, the opposite tapered surface portions 58 of the tip constitute portions of a cone cut on a plane substantially parallel to its axis but spaced from that axis so as to constitute less than one-half of the ouline of a true cone. Thus the true axes of the parts 58 of the tip may coincide with and be continuations of the axes 52 of the opposite surfaces of the part 46 of the tool. While it is preferable that the opposite halves of the parts 46 and 48 of the perforating end of the tool be symmetrical, this is not essential. Thus the radius of curvtaure of one section of the tool tip 46 may be different than the other, and the radii of curvature of the opposed part-conical portions 58 of the tapered point of the tool may be different. The angle of taper is preferably from twenty-five degrees to sixty-five degrees to the tool axis.

In the use of the device, assuming that the fitting has been suitably secured in the conduit or member 26 to be tapped, and that a branch line has been connected at the fitting part 24, the device is ready for use by introducing the punch member with a dry lubricant applied to its perforating end part, into the fitting with its screw-threaded end portion 36 outermost and its perforating tip portion 46, 48 innermost. As the punch tool is advanced endwise by rotating it in the threaded bore of the fitting part 22, its rounded leading edge 56 comes into contact with the steel wall member 26 to be perforated. As rotative advance continues following initial contact with member 26, the rotation of the tool serves to displace the metal of the member 26 and to perform a swedging or cold forming operation which progressively increases the penetration of the member 26. As this occurs, contact of the tool tip with the work occurs only at the ridge portions 56 and 54 of the tool tip. In other words, the areas of contact of the tool tip with the work are limited in extent, and the major portion of the surface area of the tip surfaces 58 are free and clear of the work piece. This minimizes fractional resistance to rotation of the tool as the tool is advanced by rotation. In this connection it will be apparent that only a narrow linear area of contact exists between the tool tip and the work piece being perforated, which linear area of contact exists in advance of rotative direction of movement of the tool. The trailing portion of the tip surface extending from each ridge portion 54, 56 is free of the work piece at the recess or opening being formed. At the same time the clearance is small so that the strength of the tool tip is not reduced or impaired, and danger of breakage of the tool is maintained at a minimum.

After the tool has progressed through the steel wall at its tip 46, continued rotation of the tool and continued axial advance thereof causes the formation of a cylindrical bore which is defined by the opposed longitudinal ribs of the portion 46 of the tool. During this operation the tapered tip serves to deflect laterally flash portions 60 of the steel member 26 without disconnecting or separating them from the member 26. The operation continues until a perforation 62 is formed in the member 26 which is of cylindrical character and preferably of substantially uniform diameter throughout. Further advance of the tool may occur until the frusto conical shoulder 44 engages the member 26 and may deform the mouth of the opening at 64 to provide a seat and a valving action closing the opening 62 when the parts are in the position illustrated in FIG. 2.

It will be apparent that after the tool has formed the opening 62 it may be withdrawn from the opening, as illustrated in FIG. 3, thereby permitting flow of fluid through the opening 62 and through the part 22 of the fitting around the tool to the branch part 24 of the fitting. The tool is retained in place within the outer end of the fitting part 22, as illustrated, and provides a seal against escape of fluid by reason of the screw-threaded connection of the tool part 36 therein. The device may be further sealed by the application of a cap 32 which serves the additional function of protecting the unit against unauthorized manipulation of the tool within the fitting and of protecting the internal screw threads of the fitting against dirt or foreign material. At the same time the device can be manipulated, if desired, for the purpose of shutting off any flow of fluid from the part 26 to the fitting part 24 by removing the cap 32 and advancing the tool to the FIG. 2 position for valving and shutoff at the valving frusto conical shoulder 44.

In the embodiment of the invention illustrated in FIGS. 7, 8 and 9, the leading end portion of the tool differs from that illustrated in FIGS. 1 to 6, inclusive, in that the part 46′ thereof, from which the pointed end projects, is cylindrical. The pointed tip constitutes two part-conical sections having surfaces 58, as defined by the portion of a cone whose axis is eccentric of the axis of the tool, so as to define ridges 54 and curved tip 56 as previously described. As a result of projection of the part-conical surfaces 48 from the cylindrical part 46′, the line of junction between the parts 46′ and 58 is curved, as seen at 66 in FIGS. 8 and 9.

The embodiment illustrated in FIGS. 7, 8 and 9 functions similarly to that described previously insofar as the penetration of the work piece is concerned, and differs therefrom only with respect to the amount of friction which exists between the part 46′ and the bore 62 when the tool is positioned in the formed opening in a location similar to that illustrated in FIG. 2. It will be observed that the reference numerals employed in connection with the embodiment of FIGS. 7, 8 and 9 are similar to those utilized in the embodiment illustrated in FIGS. 1 to 6 where the parts are similar.

Another embodiment of the invention is illustrated in FIG. 10. In this embodiment of the invention, a cylindrical tool shaft portion 46′ terminates in a pair of curved tapered tip faces 68 whose curvature is both circumferential and longitudinal and is to be distinguished from the part-conical configuration of the previously described embodiments. The curved faces 68 are arranged so that on any transverse section of the tip, the configuration will be defined by two arcuate parts joined at substantially diametrically opposed ridge portions 70. The portion of greatest width of the tip on any transverse cross-section at the tip will occur between the ridge portions 70.

By virtue of the longitudinal curvature of this embodiment of the invention, the tip portion 72, at which the two side ridges 70 converge, will be curved on a larger radius than in the preceding embodiments. I have found that a tool of this character, although more blunt than tools of preceding forms, will function satisfactorily for the purpose of perforating a steel wall or main, such as member 26 in a device of the character under consideration, such as a device illustrated generally in FIG. 1. It will be understood also that the tip of the tool may extend from a non-circular shank portion, that is, from a shank portion of approximately the same cross-sectional configuration as the shank portion 46 of the embodiment illustrated in FIGS. 1 to 6.

While the preferred embodiments of the invention have been illustrated and described, it will be understood that changes in the construction may be made within the scope of the appended claims without departing from the spirit of the invention.

I claim:
1. A punch adapted to be screw-threaded in a T fitting connected to a steel walled fluid containing member to be tapped to convey fluid to a conduit connected to said fitting, comprising an elongated steel member having a screw-threaded end portion, a shank portion of smaller diameter than said threaded end portion, and a punching end portion of smaller cross-sectional dimension than said shank portion, said punching end portion having a tapered tip of curved non-circular cross-sectional shape on all transverse planes thereof and characterized by converging ridges extending along said tip at opposite sides thereof and constituting work-engaging hole-forming parts of said tip as said punch is rotated to advance it axially to and through the wall to be tapped.

2. A punch as defined in claim 1, wherein
said punching end portion is of non-circular cross-section defined by part-cylindrical surfaces and providing opposite longitudinal ridges between said part-cylindrical surfaces.

3. A punch as defined in claim 1, wherein
said tapered tip is defined by two part-conical surface portions having their respective axes spaced from and substantially parallel to the axis of said punch.

4. A punch as described in claim 1, wherein
said tapered tip is defined by two surface portions extending between said ridges and curved longitudinally thereof.

5. A steel punch adapted to be screw-threaded in a T fitting secured to a steel pipe main and connected to a branch conduit,
said punch having a screw-threaded trailing end portion, an intermediate shank portion of smaller cross-sectional size than said threaded portion and the bore of said fitting, and a leading end portion terminating in a perforating tip portion,
said tip portion being tapered and formed by two part-conical surface portions defining converging ridges therebetween,
said part-conical surface portions having their respective axes parallel to and oppositely spaced from the axis of said punch.

6. A steel punch adapted to be screw-threaded in a T fitting secured to a steel pipe main and connected to a branch conduit,
said punch having a screw-threaded trailing end portion, an intermediate shank portion of smaller cross-sectional size than said threaded portion and the bore of said fitting, and a leading end portion terminating in a perforating tip portion,
said tip portion being tapered and formed by two part-conical surface portions defining converging ridges therebetween,
said part-conical surface portions having their respective axes parallel to and oppositely spaced from the axis of said punch,
said ridges of said tip portion merging at a central leading rounded edge part of small radius compared to the cross-sectional dimension of said punch.

7. A steel punch adapted to be screw-threaded in a T fitting secured to a steel pipe main and connected to a branch conduit,
said punch having a screw-threaded trailing end portion, an intermediate shank portion of smaller cross-sectional size than said threaded portion and the bore of said fitting, and a leading end portion terminating in a perforating tip portion,
said tip portion being tapered and formed by two part-conical surface portions defining converging ridges therebetween,
said part-conical surface portions having their respective axes parallel to and oppositely spaced from the axis of said punch,
said leading end portion being of non-circular cross-section defined by two part-cylindrical surface portions defining opposed longitudinal ridges therebetween,
said part-cylindrical surface portions having their respective axes parallel to and spaced from the axis of said punch.

References Cited by the Examiner
UNITED STATES PATENTS

| | | | |
|---|---|---|---|
| 2,950,637 | 8/1960 | Merrill | 137—318 |
| 2,990,731 | 7/1961 | Merrill | 77—37 |
| 3,094,137 | 6/1963 | Burke | 137—318 |
| 3,142,205 | 7/1964 | Halslander | 77—38 |

CHARLES W. LANHAM, *Primary Examiner.*

G. P. CROSBY, *Assistant Examiner.*